No. 669,297. Patented Mar. 5, 1901.
H. ACKERMANN.
SAW SET.
(Application filed Nov. 27, 1900.)
(No Model.)
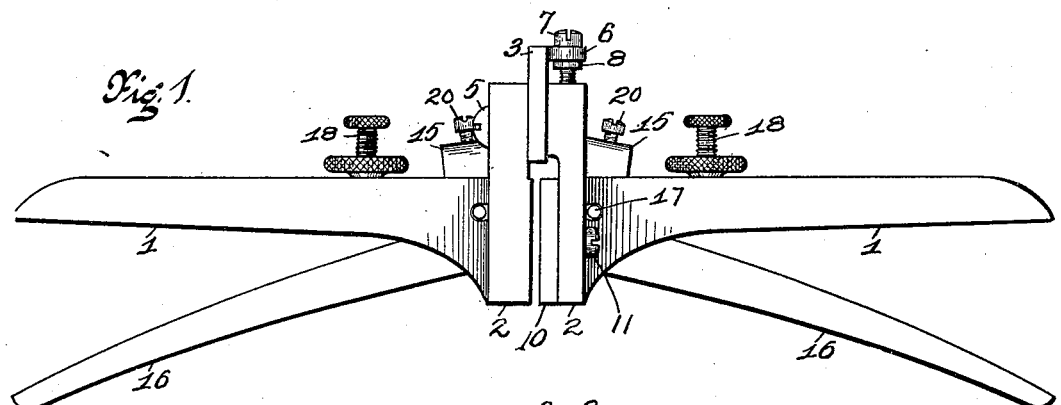
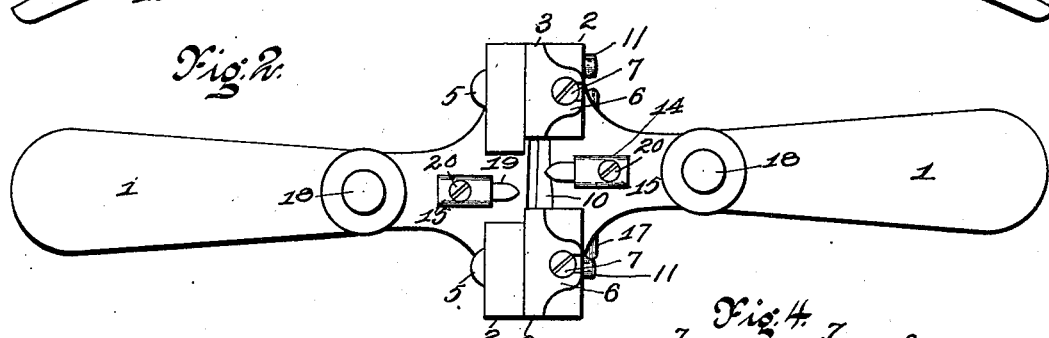
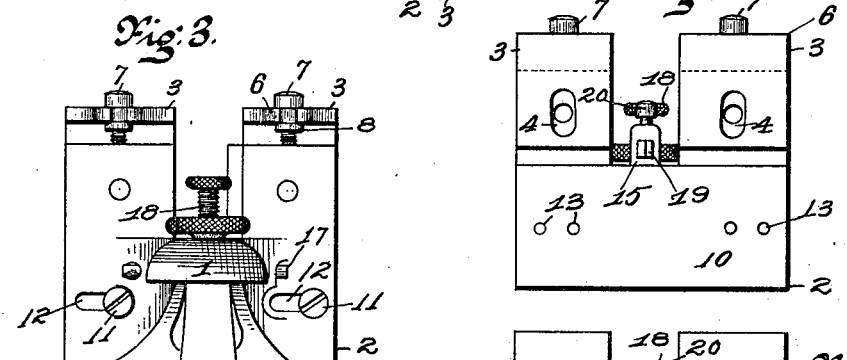
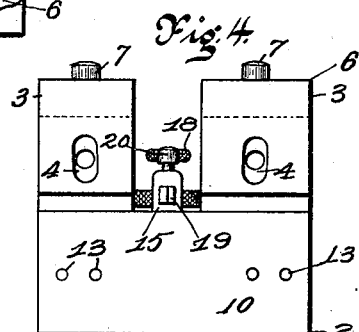
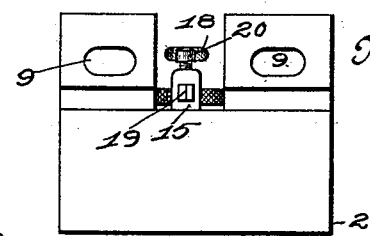
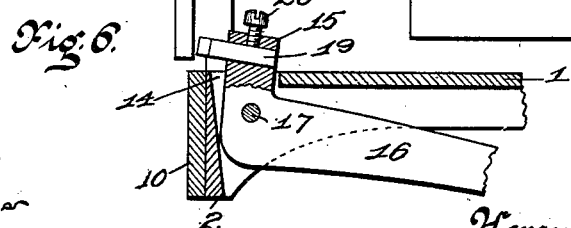
Witnesses:
Alfred O. Eicker
J. H. Rippey
Inventor
Henry Ackermann.
By Higdon & Longan Atty's

UNITED STATES PATENT OFFICE.

HENRY ACKERMANN, OF ST. LOUIS, MISSOURI.

SAW-SET.

SPECIFICATION forming part of Letters Patent No. 669,297, dated March 5, 1901.

Application filed November 27, 1900. Serial No. 37,944. (No model.)

*To all whom it may concern:*

Be it known that I, HENRY ACKERMANN, of the city of St. Louis, State of Missouri, have invented certain new and useful Improvements in Saw-Sets, of which the following is a full, clear, and exact description, reference being had to the accompanying drawings, forming a part hereof.

This invention relates to saw-sets; and it consists of the novel construction, combination, and arrangement of parts hereinafter shown, described, and claimed.

Figure 1 is a side elevation of my improved saw-set. Fig. 2 is a plan view. Fig. 3 is an end view. Figs. 4 and 5 are views showing the adjacent ends of two frames forming the essential parts of my invention. Fig. 6 is a sectional view showing the manner in which certain parts are secured together.

Referring to the drawings in detail, 1 denotes stationary handles, rigid with the inner ends of which are the blocks or enlargements 2, between which the saw is adapted to be received and retained while the teeth are being set.

3 indicates regulating-blocks carried between the upper sides of the blocks 2, and each of said blocks 3 is provided with a vertical slot 4, through which pass the retaining-screws 5, by means of which the blocks 2 are secured together. As shown, the screws 5 pass entirely through one of the blocks 2 and through the slots 4 and into the opposite block 2. The upper edge of each of the blocks 3 is provided with the lateral flange 6, having a slot in its outer side adapted to receive a screw 7, threaded into an opening in the upper portion of the block 2. The head of the screw 7 bears upon the upper side of the flange 6, and a projection 8, rigid with the body of the screw, rests against the under side of the flange, as shown in Fig. 1. By turning the screws 7 the blocks 3 may be moved up or down, as desired, thereby permitting the proper adjustment of saws having different lengths of teeth.

The blocks 2, through which the screws 5 pass, are also provided with two slots 9, permitting lateral adjustment of the two blocks to allow for the reception of saws the teeth of which are different distances from each other. For a saw whose teeth are close together the punches which are used to set the teeth will be brought nearer to each other, and when it is desired to set a saw having larger and farther-removed teeth the punches are moved farther apart, the slots 9 permitting such adjustment.

Adjacent surfaces of the blocks 2 are cut away below the blocks 3 to form a notch or curve to receive the saw. This notch is wider at one side than at the other, and carried by one of the blocks 2 is an adjusting-plate 10, substantially wedge-shaped, corresponding to the shape of the space between the blocks 2. This plate is held in position by screws 11, which pass through the slots 12, formed in one of the blocks 2, and entering openings 13, formed in the adjusting-plate 10. By moving the plate 10 in the required direction the space between the blocks, in which the saw is carried, may be increased or diminished in size, according to the thickness of the saw which it is desired to set—that is to say, by moving the plate 10 toward the larger end of the space between the blocks the space provided for the reception of the saw will be increased in size and by moving it in the opposite direction the size of the space will be diminished.

Each of the handles 1 adjacent to its block 2 is provided with an opening 14, within which operates a projection 15, rigid with the operating-handles 16. The said handles 16 are pivotally secured to the handles 1 by the pins 17, and the scope of their movement may be determined by the regulating-screws 18, carried by the handles 1. An opening is formed near the upper end of each of the projections 15, and within the said openings are carried the punches 19, adjustably held in position by means of screws 20. The said punches 19 project toward each other over the space formed between the blocks 2 for the reception of the saw and are normally out of alinement, as shown in Fig. 2, by which arrangement one punch is made to engage against and set a tooth adjacent to the tooth set by the other punch.

In using my improved saw-set, the parts are attached together, as shown in Figs. 1 and 2, and the block 10 is moved to provide a space of the proper size for the reception of the saw. The blocks 3 are moved up or down, according as the teeth are long or short, and the blocks 2 are adjusted laterally so that the punches 19 will be in alinement with and bear against the adjacent teeth. The handles 16 are then operated, bringing the punches 19 against the teeth and giving them the proper set, the said punches having previously been adjusted in the required position. The saw is moved endwise within the space provided for its reception as the teeth are set, and all the teeth will be given exactly the same angle.

I claim—

1. In a saw-set, a pair of frames attached to each other and having a space for the reception of a saw, means for increasing or diminishing the size of the space, a supporting-handle rigid with each of said frames, and punches carried by said frames for setting the saw-teeth.

2. A saw-set, consisting of a pair of frames secured together and having a space for the reception of the saw, means for increasing or diminishing the size of the space, stationary supporting-handles rigid with each of said frames, punches pivotally carried by said frames, and means for operating the same.

3. A saw-set, consisting of a pair of frames attached to each other and having a space for the reception of the saw, means for increasing or diminishing the size of the space, a stationary handle rigid with each of said frames, punches pivotally carried by the said frames, means for adjusting the punches relative to each other, and means for operating them.

4. In a saw-set, a pair of frames, adjustably secured together and having a space for the reception of the saw, regulating-blocks carried between said frames for regulating the depth of the space, and punches pivotally carried by said frames.

5. In a saw-set, a pair of frames attached to each other, means for adjusting said frames laterally, punches pivotally supported by said frames, means for regulating the extent of movement of said punches, and means for adjusting said frames to set a large or a small saw.

In testimony whereof I affix my signature in presence of two witnesses.

HENRY ACKERMANN.

Witnesses:
 ALFRED A. EICKS,
 JOHN C. HIGDON.